(12) United States Patent
Dufty

(10) Patent No.: US 8,499,849 B2
(45) Date of Patent: Aug. 6, 2013

(54) ROLLER CLEANING ASSEMBLY

(75) Inventor: Raymond Jeffrey Dufty, Ernest (AU)

(73) Assignee: Tru-Turf Pty Ltd., Ernest, Queensland (AU)

( * ) Notice: Subject to any disclaimer, the term of this patent is extended or adjusted under 35 U.S.C. 154(b) by 0 days.

(21) Appl. No.: 13/447,882

(22) Filed: Apr. 16, 2012

(65) Prior Publication Data

US 2012/0247794 A1   Oct. 4, 2012

Related U.S. Application Data

(63) Continuation-in-part of application No. PCT/AU2010/001237, filed on Sep. 21, 2010.

(30) Foreign Application Priority Data

Oct. 15, 2009 (AU) .............................. 2009905029

(51) Int. Cl.

| A01B 5/00 | (2006.01) |
|---|---|
| A01B 7/00 | (2006.01) |
| A01B 15/16 | (2006.01) |
| A01B 21/00 | (2006.01) |
| A01B 23/06 | (2006.01) |
| A01B 35/28 | (2006.01) |
| A01B 39/08 | (2006.01) |
| A01B 41/04 | (2006.01) |

(52) U.S. Cl.
USPC ........................................... 172/521; 56/249

(58) Field of Classification Search
USPC ............... 172/521, 118, 21, 22, 42, 120, 121, 172/122, 540; 47/1.01 R; 404/123, 122; 56/7, 56/249, 294, 255, 193, 229
See application file for complete search history.

(56) References Cited

U.S. PATENT DOCUMENTS

| 1,886,408 | A | * | 11/1932 | Locke et al. .................... 56/15.3 |
|---|---|---|---|---|
| 2,861,686 | A | * | 11/1958 | Johnson ......................... 209/690 |
| 2,972,218 | A | * | 2/1961 | Benson .......................... 56/15.3 |
| 3,715,771 | A | | 2/1973 | Fukuba |
| 4,021,996 | A | * | 5/1977 | Bartlett et al. ....................... 56/7 |
| 4,084,283 | A | | 4/1978 | Rosendall |
| 4,246,674 | A | * | 1/1981 | Ingermann et al. .................. 15/4 |
| 5,191,833 | A | * | 3/1993 | Clevenger, Jr. .................. 100/88 |
| 5,228,277 | A | | 7/1993 | Smith et al. |
| 5,245,925 | A | * | 9/1993 | Switall et al. ................. 101/425 |
| 5,468,267 | A | | 11/1995 | Dufty et al. |
| 5,597,413 | A | * | 1/1997 | Kromm, Jr. ..................... 118/60 |

(Continued)

FOREIGN PATENT DOCUMENTS

| AU | 522301 A | | 5/1982 |
|---|---|---|---|
| AU | 9852766 A | * | 8/1998 |
| GB | 2262433 A | | 6/1993 |
| WO | 2008052272 A1 | | 5/2008 |

*Primary Examiner* — Árpád Fábián-Kovács
(74) *Attorney, Agent, or Firm* — Porzio, Bromberg & Newman, P.C.

(57) ABSTRACT

A roller cleaning assembly for a grass processing apparatus, such as a grass or turf roller, has a roller housing releasably mountable in a hollow cavity in the body of a smoothing head, where the smoothing head contains idler or smoothing rollers. A pair of roller brushes is rotatably journalled in the roller housing, and are driven by the idler or smoothing rollers via friction drive rollers. Each brush roller has at least one spiral brush and/or spiral wiper blade to clean the external surfaces of the adjacent idler or smoothing rollers and deposits the clippings or other waste in collector sections in the roller housing.

11 Claims, 3 Drawing Sheets

U.S. PATENT DOCUMENTS

| | | | |
|---|---|---|---|
| 5,682,735 A * | 11/1997 | Swenson et al. | 56/249 |
| 6,029,433 A * | 2/2000 | Westbrook et al. | 56/249 |
| 6,457,903 B1 | 10/2002 | Dufty | |
| 6,688,094 B2 * | 2/2004 | Berndt et al. | 56/249 |
| 7,530,214 B1 * | 5/2009 | Rinholm et al. | 56/16.9 |
| 7,603,744 B2 * | 10/2009 | Reindle | 15/319 |
| 7,647,756 B2 * | 1/2010 | Rinholm et al. | 56/249 |
| 7,647,757 B2 * | 1/2010 | Rinholm et al. | 56/249 |
| 2009/0129865 A1 | 5/2009 | Dufty | |

* cited by examiner

ROLLER CLEANING ASSEMBLY

CROSS REFERENCE TO RELATED APPLICATION

This application is a Continuation-in-Part of International Application No. PCT/AU2010/001237, filed 21 Sep. 2010, which claims the benefit of Application No. 2009905029, filed in Australia on 15 Oct. 2009, the disclosures of which Applications are incorporated by reference herein.

BACKGROUND OF THE INVENTION

1. Field of the Invention

This invention relates to a roller cleaning assembly which is suitable for, but not limited to, use with rollers for rolling the turf of grass surfaces such as bowling greens, golfing greens and tennis courts formed from grass.

It will also be appreciated that the term "grass or turf" used herein also includes artificial greens or turf surfaces.

The term "grass processing apparatus" shall include, but not be limited, grass- or lawn mowers; grass or turf rollers; mower- and roller combinations; roller- and spiker combinations; and like grass or turf preparation and/or maintenance equipment.

2. Prior Art

Hitherto, cleaning brushes have often been mounted on a roller attached to a lawn mower frame, and were used to clean grass clippings and debris from an external surface of a drive roller used in conjunction with rotary cutting blades in the form of a reel also attached to the lawn mower frame. The brush roller was also driven by drive means such as a drive gear assembly powered by a motor mounted to the frame. In one case, as described in U.S. Pat. No. 5,682,735, the drive gear assembly included a drive gear driven by the motor of a driven gear fixed with the brush roller and a smoothing gear for transmitting rotational motion from the drive gear to the driven gear.

Reference may also be made to U.S. Pat. No. 4,021,996 (Bartlett et al); U.S. Pat. No. 5,228,277 (Smith et al) and U.S. Pat. No. 6,029,433 (Westbrook et al) which all relate to roller brushes for sweeping an adjacent drive roller of a lawn mower where the roller brush is subject to operation of a drive motor for rotation. In U.S. Pat. No. 4,021,996, the roller brush is driven by a belt driven from a sheave fixed to a reel sheave. In U.S. Pat. No. 5,228,277 the roller brush can be driven to rotate in the same direction as the drive roller, or be driven counter to the rotation of the roller housing. In U.S. Pat. No. 6,024,433, the roller brush is subject to being driven from a belt drive, having automatic adjustment, which extends between a reel of the lawn mower and the roller brush.

Therefore, in a summary of the prior art, the use of a drive motor and associated pulleys, or sprockets, or gearing, to drive a roller brush to clean an adjacent roller, is expensive to manufacture and/or difficult to install or dismantle. It is also time consuming and inefficient in operation, as the clippings often drop to the ground, which is especially damaging if grub or moth larvae are carried on the clippings as they can cause disease(s) in the grass or turf.

SUMMARY OF THE PRESENT INVENTION

It is, therefore, an object of the invention to provide a roller cleaning assembly which overcomes, or at least alleviates to some extent, the above-mentioned disadvantages of the prior art.

It is a preferred object of the present invention to provide a roller cleaning assembly which is particularly suitable for, but not limited, to grass processing machines of the types described and illustrated in U.S. Pat. No. 5,468,267 (Dufty); U.S. Pat. No. 6,457,903 (Dufty) and U.S. 2009/0129865 A1 (=WO 2008/052272) (Dufty); the disclosures (including the description and drawings) of which are herein incorporated by reference.

The roller cleaning assembly of the invention is suitable for a roller or rollers of a grass processing apparatus of the type having at least one smoothing head, the or each smoothing head having a body with at least one idler or smoothing roller rotatably journalled in a hollow cavity in the body, the roller cleaning assembly including:

a brush roller housing locatable in the hollow cavity in the body;

at least one brush roller rotatably journalled in the brush roller housing and located adjacent at least one of the idler or smoothing rollers and having a similar length to said at least one of the idler or smoothing rollers and oriented parallel thereto;

at least one brush or flexible wiper blade extending from the or each brush roller and operable to engage an external surface of the adjacent idler or smoothing roller or rollers; and a friction drive system interconnecting the or each brush roller and the adjacent idler or smoothing roller or rollers;

so arranged that as the or each idler or smoothing roller is rotated as the smoothing head is advanced, the external surface of the or each idler or smoothing roller drives the adjacent brush roller, through the friction drive system, to cause the at least one brush or flexible wiper blade to remove clippings or other waste material from the external surface of the or each idler or smoothing roller or rollers.

The, or each, brush may have fibres formed of natural or synthetic materials; while the, or each, flexible wiper blade may be formed, e.g. by extrusion, from elastomeric materials, such as natural rubber, synthetic rubber, plastic-material or the like, which may incorporate reinforcing cords or fibres.

More preferably, the brush or cleaning member may be at least one spiral brush, or at least one flexible wiper blade, mounted on a support roller; or may be at least one elongate brush, or at least one flexible wiper blade, having a support axle extending therethrough; which is preferably mounted in a brush housing which, in turn, is releasably attachable to the grass processing apparatus.

Preferably, the brush housing may be provided with suitable bearings at each end to facilitate rotation of the at least one brush or the at least one flexible wiper blade.

Preferably, where there is a plurality (e.g. 2-3) of the brushes or flexible wiper blades located in the brush housing, each brush or flexible wiper blade may project through a respective elongate slot located in the brush housing.

Preferably, a collector section, to receive the clippings, is provided adjacent each brush or flexible wiper blade, or between an adjacent pair of the brushes or flexible wiper blades.

The brush housing may be mountable in the grass processing apparatus in any suitable manner. For example, the brush housing may be inserted through an adjacent aperture of a smoothing head or undercarriage which may have a plurality of smoothing rollers used for rolling a grass surface. The rollers may be unevenly spaced, as described in U.S. Pat. No. 5,468,267 (Dufty). However, it will also be appreciated that the rollers may be evenly spaced. Another example of an undercarriage to which the brush of the present invention may be applied is Australian Patent 522301 (=AU 197833622 A1) (Malowton Pty Ltd).

In a preferred embodiment of the invention, the smoothing head as described in U.S. Pat. No. 5,468,267 has an end plate which is modified with an access aperture for insertion of the brush housing. The access aperture may have a peripheral shape that is complementary to a side plate of the brush housing and the brush housing may be releasably retained within the undercarriage in any suitable manner such as by the use of suitable fasteners engaging with corresponding aligned apertures provided on both the brush housing and the smoothing head.

The grass processing apparatus to which the roller cleaning assembly of the invention may be applied includes lawn mowers, lawn rollers, lawn slicers; and the rollers being cleaned by the roller cleaning assembly of the invention may be drive rollers or idler or smoothing rollers as the case may be.

BRIEF DESCRIPTION OF THE DRAWINGS

To enable the invention to be fully understood, reference will now be made to a preferred embodiment of the roller cleaning assembly of the invention as illustrated in the attached drawings, wherein.

DETAILED DESCRIPTION OF THE PREFERRED EMBODIMENTS

Figure 1:
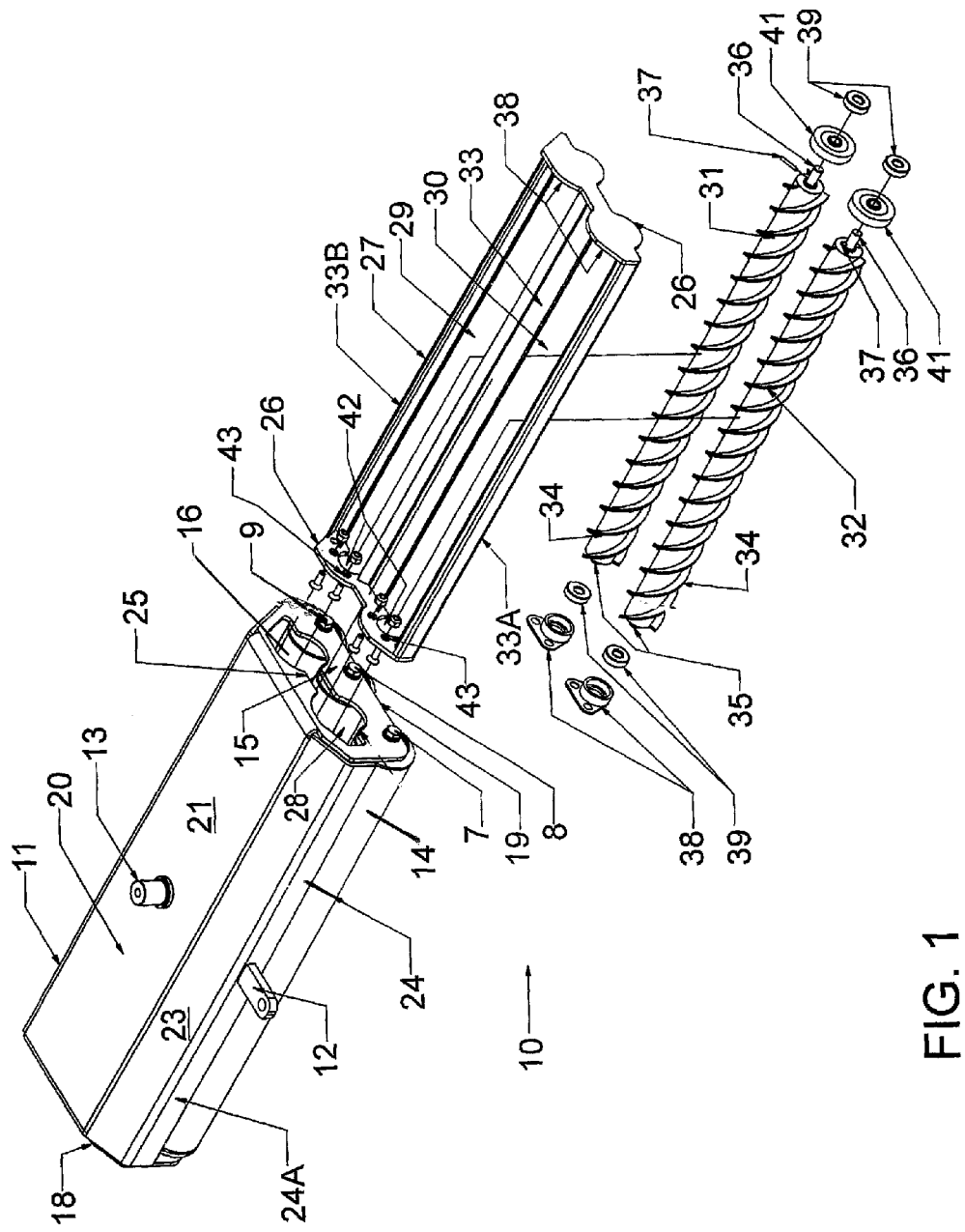
FIG. 1 is an "exploded" perspective of the roller cleaning assembly fitted to a smoothing head of a grass processing apparatus of the type disclosed in U.S. Pat. No. 5,468,267.

The roller cleaning assembly 10 of the invention, as shown in FIG. 1, includes a smoothing head (or undercarriage) 11, as disclosed in U.S. Pat. No. 5,468,267, which has a steering link 12 for attachment to a steering mechanism (101) of the turf roller of U.S. Pat. No. 5,468,267 (100) (see FIG. 2); a spigot 13 for pivotal attachment of the smoothing head 11 to the frame (102) of the turf roller (100); and idler or smoothing rollers 14, 15 and 16, which are rotatably journalled on opposed end plates 18 and 19 by fasteners 7, 8 and 9 engaging respective longitudinal stub axles (not shown) for each of the idler or smoothing rollers 14, 15 and 16. Suitable bearings (not shown) are attached to the end plates 18 and 19 to facilitate rotation of the idler or smoothing rollers 14, 15 and 16 when they contact the grass or turf to be rolled.

The smoothing head 11 has a body 20, which includes a top plate 21; and a pair of side plates 23, each having a downwardly extending flange 24 and beveled portion 24A.

Figure 2:
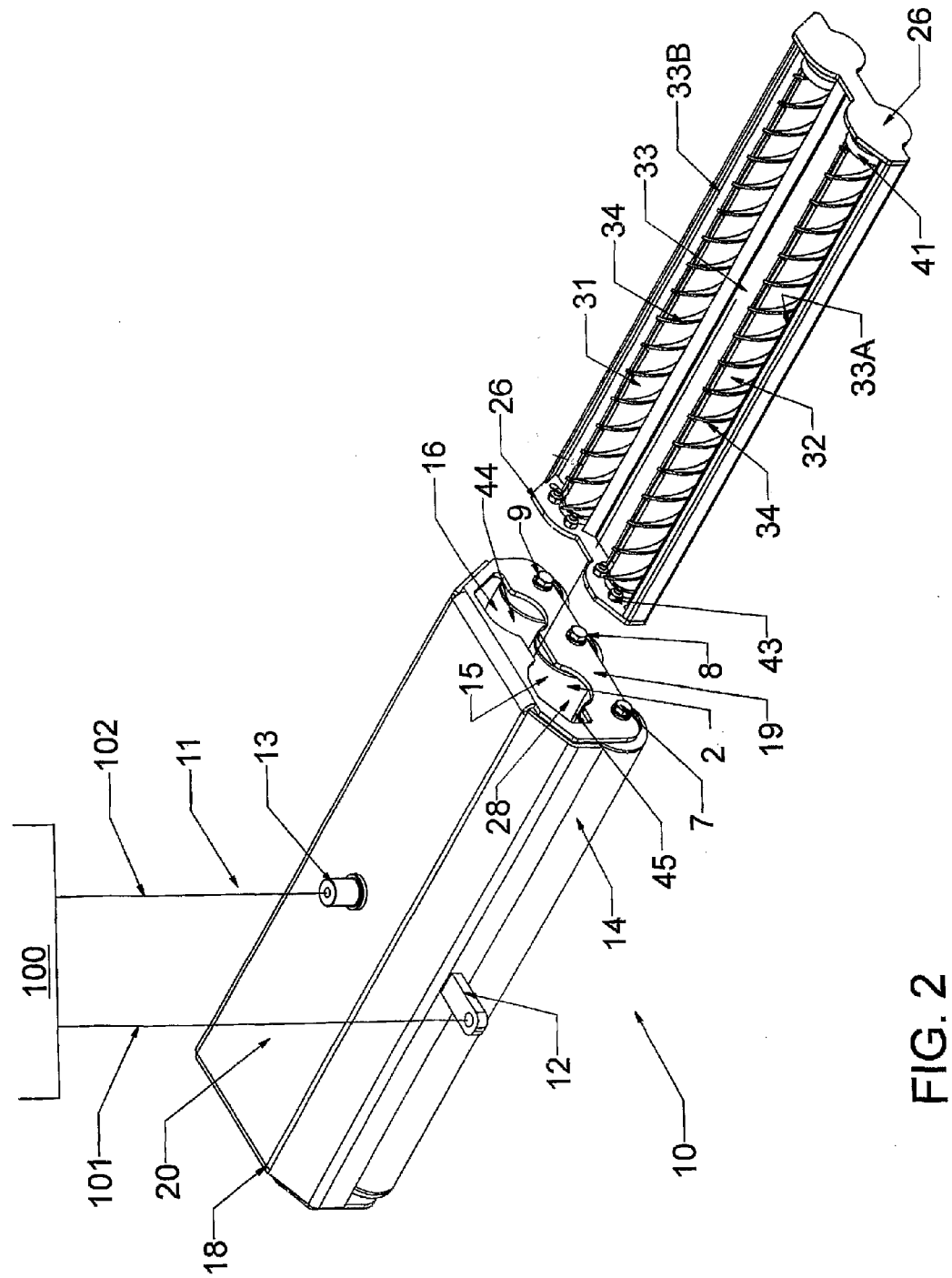
FIG. 2 is a similar view to FIG. 1, but where each brush roller is retained in the brush roller housing.

The end plate 19 incorporates an aperture 25, which is complementary in shape to an end plate 26 of the brush roller housing 27, so arranged that the brush roller housing 27 may be inserted into a hollow cavity 28 in smoothing head 11, as shown in FIGS. 1 & 2.

The brush roller housing 27 includes a pair of elongate slots 29 and 30, which each may accommodate a downwardly extending part of respective brush rollers 31 and 32. An intermediate collector section 33 is interposed intermediate the slots 29 and 30 and also between opposed side collector sections 33A and 33B. Each of collector sections 33, 33A and 33B comprise an elongate recess or valley as shown by slot 33.

Each brush roller 31 and 32 has a spiral brush 34 attached to an elongate support axle 35, where the spiral brush 34 has substantially tangentially-extending fibres of "tough" plastics-material. Each support axle 35 has an outwardly projecting stub axle 36. Each brush roller 31 and 32 also has an annular end part 37.

In use, each of sections 33, 33A and 33B collect debris from brush 34 after contact with smoothing rollers 14, 15 and 16.

A cover or housing 38, and associated bearing 39, is provided at each end of the brush rollers 31 and 32. Friction rollers 41 are mounted on the stub axles 36 of each of the brush rollers 31 and 32. The friction rollers 41 engage a pin 37 inserted in a hole through the stub axles 36. In use, each of friction rollers 41 engages with an adjoining external surface of the idler or smoothing rollers 14, 15 and 16; and the rotation of the idler or smoothing rollers 14, 15 and 16, via the friction drive arrangement 41, causes the brush rollers 31 and 32 to rotate and drive each spiral brush 34, where the contact between the spiral brushes and the external surfaces of the idler or smoothing rollers 14, 15 and 16 will result in dirt, grass clippings, grub or moth larvae and/or eggs being cleaned therefrom and collected in the collector sections 33, 33A and 33B.

Each of the bearing housings 38 is releasably engagable in a respective adjacent retaining aperture or recess 42 in the end plates 26.

Attachment apertures 43 are provided for the location of appropriate fasteners (not shown) for retention of the brush roller housing 27 within the hollow cavity 28 of the smoothing head 11.

FIG. 2 shows each brush roller 31 and 32 located in their associated mounting slots 29 and 30. It will be noted that brush roller 31 may be located in the recess or valley 44 between adjacent idler or smoothing rollers 15 and 16 and thus be in contact with either, or both, of these rollers. On the other hand, brush roller 32, located in the recess 45, only contacts idler or smoothing roller 14. As the idler or smoothing rollers 14, 15 and 16 are unevenly spaced, the gap between adjacent idler or smoothing rollers 14 and 15 is greater than the corresponding gap between the idler or smoothing rollers 15 and 16. However, it will be appreciated that the brush rollers 31 or 32 may contact only an adjacent idler or smoothing roller 14, 15 or 16; or an adjacent pair of the idler or smoothing rollers 14, 15 and 16; as will be required.

In operation, it will be noted that upon rotation of idler or smoothing rollers 14, 15 and 16, due to contact with the grass or turf, the idler or smoothing roller 14 and each of the idler or smoothing rollers 15 and 16 will contact the respective friction drive rollers 41 of each of the brush rollers 31 and 32 to thereby drive each of the brush rollers 31 and 32, which clean the idler or smoothing rollers 14, 15 and 16 in return.

It will also be noted that the term "brush" as used herein also includes within its scope any appropriate cleaning member that may be used to clean an external surface of a roller such as a layer of felt, fabric or other suitable cleaning implement.

Figure 3:
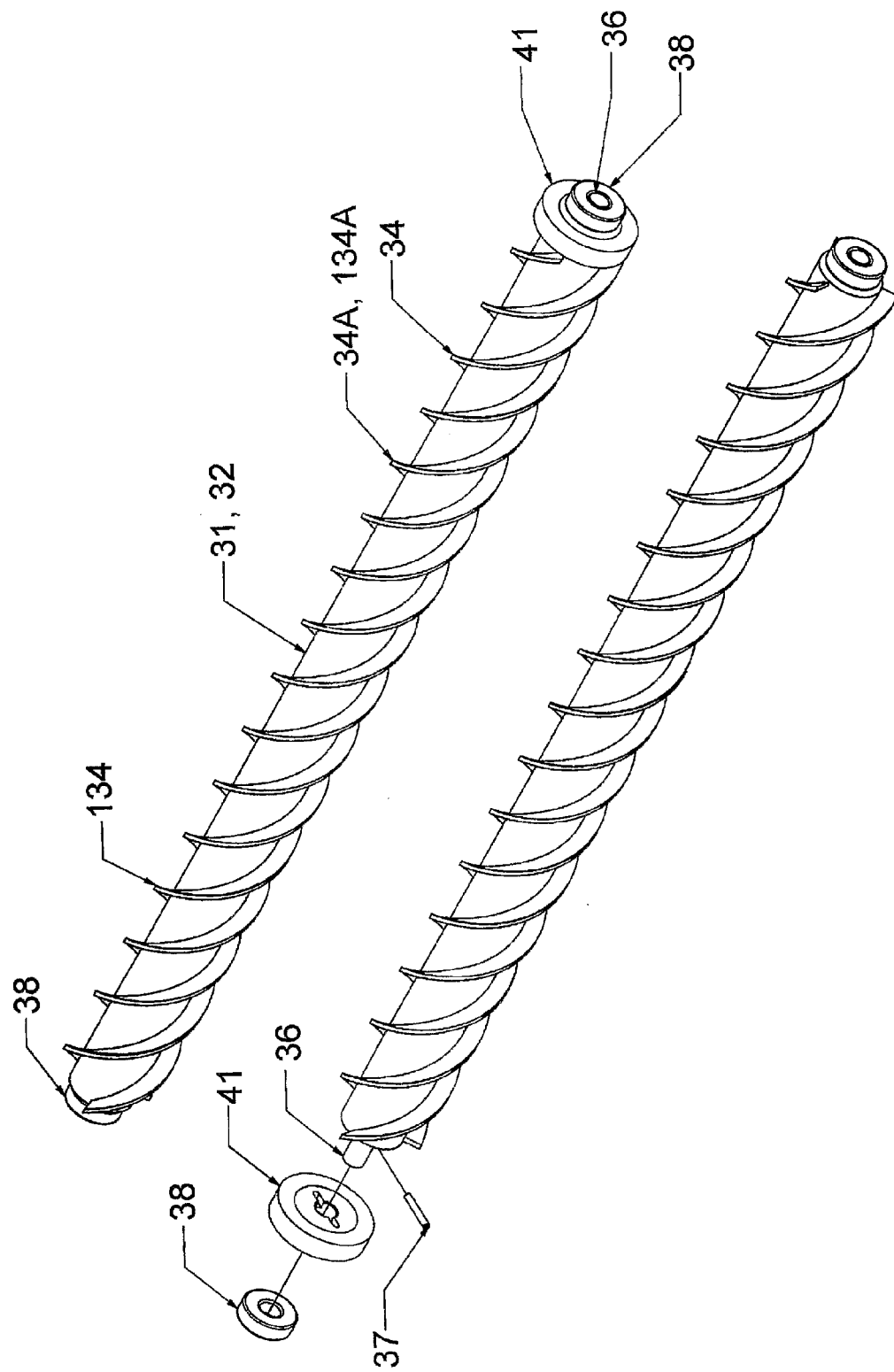
FIG. 3 is a perspective view of an assembled brush roller.

In an alternative embodiment, the spiral brushes 34 may be substituted by flexible spiral wiper blades 134, as shown in FIG. 3. The spiral wiper blades 134 are preferably formed, e.g. by extrusion, from natural rubber, synthetic rubber, or "tough" plastics—or other elastomeric materials; and may incorporate reinforcing cords or fibres (e.g. of nylon, rayon, carbon or KEVLAR®).

Further, as shown in FIG. 3, either, or both, brush rollers 31 and 32 may be provided with a spiral wiper blade 134 interposed with the spiral brush 34; or be provided with two or more interposed spiral brushes 34 and 34A or two or more interposed spiral wiper blades 134 and 134A.

The advantages of the present invention include:

(i) the roller cleaning assembly 10 enables the efficient collection of grass clippings as well as moth- or grub larvae or eggs, which if left on the grass or turf, can cause disease;

(ii) the brush roller housing 27 is easily removed from the smoothing head 11 for cleaning and maintenance (and discharge of the contents of the collection sections 33, 33A and 33B);

(iii) the cleaning of the idler or smoothing rollers 14, 15 and 16 is carried out both quickly and efficiently; and (iv) the driving mechanism for the brush rollers 31 and 32, using friction drive rollers 41, is simple, inexpensive, efficient and reliable, and avoids the use of complicated drive systems using the gearing, the drive motors and/or the hydraulics of the "prior art" arrangements hereinbefore described.

It will also be appreciated that each brush roller 31 and 32 has approximately the same length as an adjacent idler roller 14, 15 and 16 and is parallel thereto.

Various changes and modifications may be made to the embodiments described and illustrated without departing from the present invention, as hereinafter defined in the claims.

What is claimed is:

1. A roller cleaning assembly for a roller, or rollers, of a grass processing apparatus of the type having at least one smoothing head, the or each smoothing head having a body with at least one idler or smoothing roller rotatably journalled in a hollow cavity formed in the body, the roller cleaning assembly including:
    a brush roller housing locatable in the hollow cavity in the body;
    at least one brush roller rotatably journalled in the brush roller housing and located adjacent at least one of the idler or smoothing rollers and having a similar length to said at least one of the idler or smoothing rollers and oriented parallel thereto;
    at least one brush or flexible wiper blade extending from the or each brush roller and operable to engage an external surface of the adjacent idler or smoothing roller or rollers; and
    a friction drive system interconnecting the or each brush roller and the adjacent idler or smoothing roller or rollers;
    so arranged that as the or each idler or smoothing roller is rotated as the smoothing head is advanced, the external surface of the or each idler or smoothing roller drives the adjacent brush roller, through the friction drive system, to cause the at least one brush or flexible wiper blade to remove clippings or other waste material from the external surface of the or each idler or smoothing roller or rollers.

2. An assembly as claimed in claim 1, wherein:
    the, or each, brush roller extends through a slot in a bottom wall of the brush roller housing; and
    at least one collector section is provided in the brush roller housing adjacent the slot to receive the clippings or other waste material from the brush roller.

3. An assembly as claimed in claim 2, wherein:
    the, or each, collector section comprises an elongate recess or valley in the bottom wall of the brush roller housing.

4. An assembly as claimed in claim 1, wherein:
    the, or each, brush or flexible wiper blade, is spirally wound around, or extends elongately along, the brush roller.

5. An assembly as claimed in claim 4, wherein:
    at least two of the brushes or flexible wiper blades are interposed, and spirally wound around, the brush roller; or
    at least one brush and one flexible wiper blade are interposed and spirally wound around the brush roller.

6. An assembly as claimed in claim 1, wherein:
    the friction drive system includes at least one friction drive roller fixed to at least one end of the brush roller and arranged for frictional driving engagement with the external surface of the adjacent idler or smoothing roller or rollers.

7. An assembly as claimed in claim 1, wherein:
    an end plate of the body of the smoothing head has an aperture; and
    the brush roller housing is releasably receivable in the aperture to be located in the hollow cavity of the body above the idler or smoothing roller or rollers.

8. A smoothing head for a grass processing apparatus including:
    a body with a hollow cavity;
    at least one idler or smoothing roller rotatably journalled in the hollow cavity and extending below the body; and
    a roller cleaning assembly, as claimed in claim 1, located in the hollow cavity and operable to clean an external surface of the idler or smoothing roller or rollers.

9. A head as claimed in claim 8, wherein:
    at least two of the idler or smoothing rollers are provided in the hollow cavity; and
    the, or each, brush roller of the roller cleaning assembly is operable to be driven by, and remove clippings or other waste material, from the or each adjacent idler or smoothing roller.

10. A grass processing apparatus having at least one smoothing head as claimed in claim 8.

11. A roller cleaning assembly for a roller, or rollers, of a grass processing apparatus of the type having at least one smoothing head, the or each smoothing head having a body with at least one idler or smoothing roller rotatably journalled in a hollow cavity in the body, the roller cleaning assembly including:
    a brush roller housing locatable in the hollow cavity formed in the body to facilitate removal thereof for maintenance purposes;
    at least one brush roller rotatably journalled in the brush roller housing and located adjacent at least one of the idler or smoothing rollers and having a similar length to said at least one of the idler or smoothing rollers and oriented parallel thereto;
    at least one brush or flexible wiper blade extending from the or each brush roller and operable to engage an external surface of the adjacent idler or smoothing roller or rollers; and
    a friction drive system interconnecting the or each brush roller and the adjacent idler or smoothing roller or rollers including at least one friction drive roller fixed to one end of said at least one brush roller and arranged for frictional driving engagement with the external surface of the adjacent idler or smoothing roller(s);
    so arranged that as the or each idler or smoothing roller is rotated as the smoothing head is advanced, the external surface of the or each idler or smoothing roller drives the adjacent brush roller, through the friction drive system, to cause the at least one brush or flexible wiper blade to remove clippings or other waste material from the external surface of the or each idler or smoothing roller or rollers.

* * * * *